United States Patent
Shaw et al.

(10) Patent No.: US 12,050,611 B2
(45) Date of Patent: Jul. 30, 2024

(54) MULTIPLE PROVIDER SEARCH RESPONSE VERIFICATION AND INTEGRATION

(71) Applicant: Yext, Inc., New York, NY (US)

(72) Inventors: Maxwell Shaw, New York, NY (US); Kevin Caffrey, Tyson Corner, VA (US); Marc Ferrentino, New York, NY (US)

(73) Assignee: YEXT, INC., New York, NY (US)

( * ) Notice: Subject to any disclaimer, the term of this patent is extended or adjusted under 35 U.S.C. 154(b) by 140 days.

(21) Appl. No.: 16/997,470

(22) Filed: Aug. 19, 2020

(65) Prior Publication Data

US 2021/0056115 A1    Feb. 25, 2021

Related U.S. Application Data

(60) Provisional application No. 62/888,821, filed on Aug. 19, 2019.

(51) Int. Cl.
*G06Q 30/00* (2023.01)
*G06F 16/2455* (2019.01)
(Continued)

(52) U.S. Cl.
CPC .. *G06F 16/24578* (2019.01); *G06F 16/24556* (2019.01); *G06F 16/24564* (2019.01);
(Continued)

(58) Field of Classification Search
CPC ......... G06F 16/24578; G06F 16/24556; G06F 16/9535; G06F 16/9538; G06F 16/24564; G06Q 30/0625
See application file for complete search history.

(56) References Cited

U.S. PATENT DOCUMENTS 6,327,590 B1    12/2001    Chidlovskii et al.
6,725,259 B1    4/2004    Bharat
(Continued)

FOREIGN PATENT DOCUMENTS

EP    2590092 A1    5/2013
JP    2007234008 A    9/2007

OTHER PUBLICATIONS

Takanobu, Ryuichi, et al. "Aggregating e-commerce search results from heterogeneous sources via hierarchical reinforcement learning." The World Wide Web Conference. 2019.*
(Continued)

*Primary Examiner* — Kathleen Palavecino
(74) *Attorney, Agent, or Firm* — Jeffri A. Kaminski; Venable LLP

(57) ABSTRACT

A system and method to provide search capabilities via a merchant system including search responses aggregated from multiple different search provider sources. The system and method receive, via an interface of the merchant system, a search query input from an end user system. The search query input is routed to the multiple search provider sources. A set of response to the search query input is received from at least a portion of the search providers sources. A first portion of the set of responses is identified as having a verified status. A ranking of the set of responses is generated based on a level of responsiveness to the search query input. The system and method cause, based at least in part on the ranking, a display including a search result comprising at least a portion of the set of responses.

17 Claims, 6 Drawing Sheets

(51) Int. Cl.
   *G06F 16/2457* (2019.01)
   *G06F 16/9535* (2019.01)
   *G06F 16/9538* (2019.01)
   *G06Q 30/0601* (2023.01)

(52) U.S. Cl.
   CPC ...... *G06F 16/9535* (2019.01); *G06F 16/9538* (2019.01); *G06Q 30/0625* (2013.01)

(56) References Cited

U.S. PATENT DOCUMENTS

| | | |
|---|---|---|
| 7,603,350 B1 | 10/2009 | Guha |
| 2003/0158839 A1* | 8/2003 | Faybishenko ....... G06F 16/9535 707/E17.061 |
| 2003/0220913 A1 | 11/2003 | Doganata |
| 2004/0122926 A1* | 6/2004 | Moore .................. G06F 16/951 707/E17.108 |
| 2006/0173830 A1 | 8/2006 | Smyth |
| 2009/0125482 A1* | 5/2009 | Peregrine ............ G06F 16/9038 |
| 2013/0117259 A1 | 5/2013 | Ackerman et al. |
| 2014/0101146 A1* | 4/2014 | Scriffignano ...... G06F 16/24578 707/728 |
| 2015/0127660 A1 | 5/2015 | Zilberberg |
| 2020/0201912 A1* | 6/2020 | Gordner ............ G06F 16/90324 |
| 2022/0156333 A1* | 5/2022 | Freese ................. G06F 16/9537 |

OTHER PUBLICATIONS

International Search Report and Written Opinion for PCT Patent Application No. PCT/US2020/47004, dated Nov. 23, 2020, 12 pages.

EP Office Action for Application No. EP20855774.4 dated Aug. 8, 2023, 7 pages.

Japanese Notice of Reason for Refusal in corresponding Japanese Patent Application No. 2022-510919 issued May 28, 2024 (11 pages).

* cited by examiner

| Search Provider Source | Response Grade |
|---|---|
| First Search Provider Source (Merchant System) | 95% |
| Second Search Provider Source (Merchant System) | 95% |
| Third Search Provider Source (Merchant System) | 20% |
| Fourth Search Provider Source (Merchant System) | 80% |
| Fifth Search Provider Source (Third Party System) | 10% |
| Nth Search Provider Source (Third Party System) | 5% |

FIG. 3

MULTIPLE PROVIDER SEARCH RESPONSE VERIFICATION AND INTEGRATION

CROSS-REFERENCE TO RELATED APPLICATION

This application claims the benefit of U.S. Provisional Patent Application No. 62/888,821, filed on Aug. 19, 2019, the entirety of which is incorporated herein by this reference.

TECHNICAL FIELD

The disclosure relates generally to a knowledge search platform associated with a merchant system, such as a merchant website or application.

BACKGROUND

Conventionally, an end user may conduct a search for information about a merchant using a third party search engine (e.g., Google™, Bing™, Yahoo!™ Search) or a third-party platform (e.g., Yelp™, YouTube™, etc.) The various search platforms provide the end user with information in response to the input of a search query. However, the information provided in response to the search query is frequently incorrect, inaccurate, or incomplete.

To address this problem, an end user may opt to go directly to a website or application associated with the merchant (e.g., the merchant's own website). These merchant-specific first party properties frequently provide an antiquated interface and search capabilities (e.g., a directory-type interface combined with a basic site search that displays a list of links). In addition, these websites often use complicated navigation structures (e.g., aligned with internal organization rather than end user search perspectives) powered by extremely basic search functionality. As a result, an end user is far less likely to go directly to a merchant's own properties to get answers to their questions or obtain information about the merchant.

BRIEF DESCRIPTION OF THE DRAWINGS

The present disclosure is illustrated by way of example, and not by way of limitation, and can be more fully understood with reference to the following detailed description when considered in connection with the figures as described below.

FIG. 3 illustrates an example ranking associated with search responses, in accordance with one or more aspects of the disclosure.

DETAILED DESCRIPTION

Figure 1:
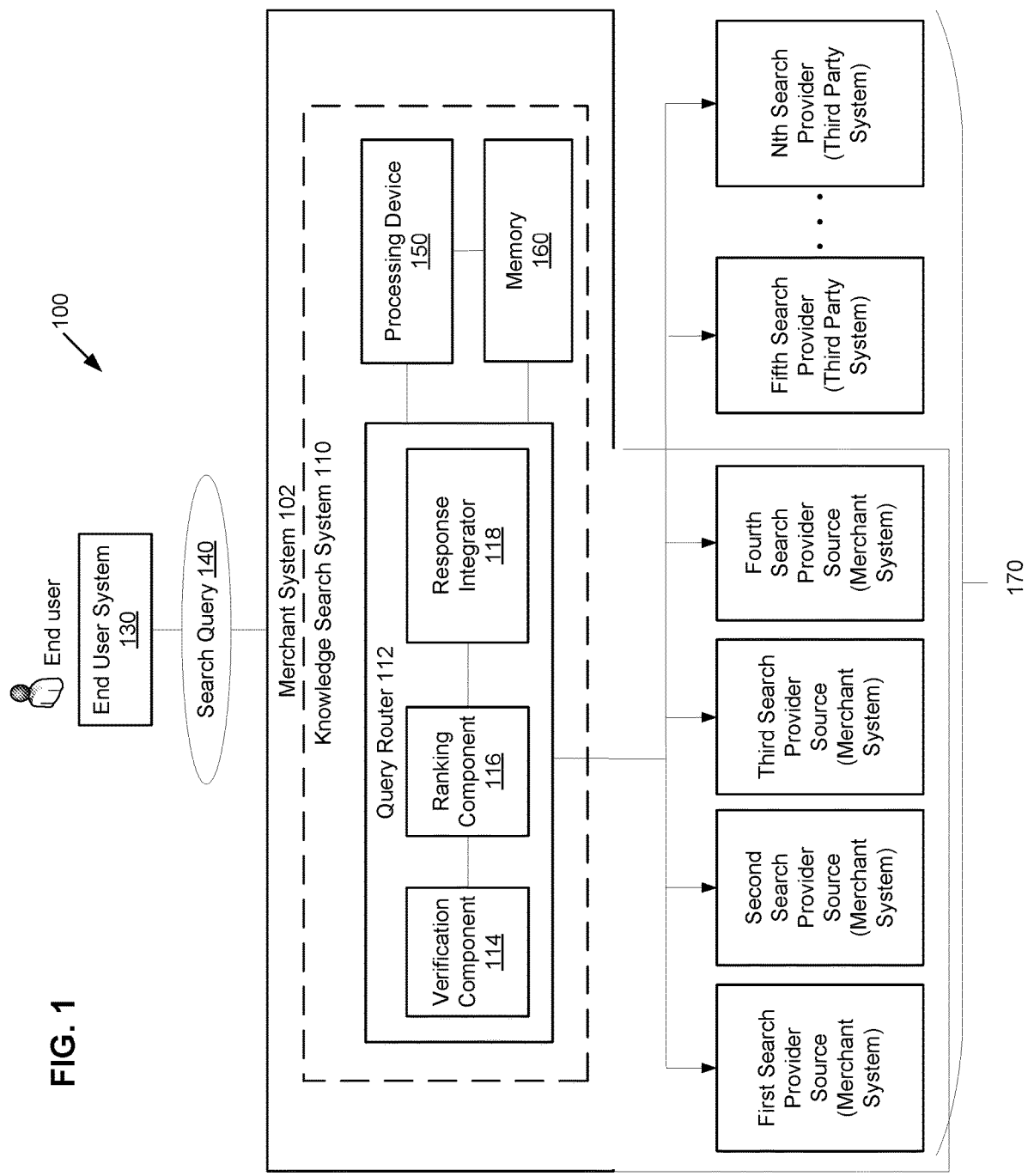
FIG. 1 illustrates an example of a computing environment including a merchant system having a knowledge search system to provide search results in response to a search query from an end user system, in accordance with one or more aspects of the disclosure.

To find relevant data with respect to a query received from an end user (e.g., a user initiating a search for information via a web interface), many search engines use a keyword search based on text data provided by the end user. In conducting the search, the end user seeks to identify a web element (e.g., a webpage) that is responsive to the query that is identified and indexed by a search engine based on the keywords in the search query input. If any of the keywords are incorrect (e.g., incomplete, include a typographical error, misspelled, etc.) or not indexed by the search engine, the information the end user seeks may not be identified or discovered in response to the query. If the combination of keywords in the search query matches a large number of webpages and information about those webpages (e.g., links) may be listed on several search result webpages. This may require the end user to manually click on multiple links and sort through hundreds or thousands of similar pages before finding, if at all, the desired information.

In other situations, the requested information responsive to the end user query may not be found due to a gap (e.g., a lack of content) between the keywords of the end user's query and the online data associated with an entity (e.g., a merchant). As such, the amount of information and misinformation that the user must negotiate to find a particular product or service is a time consuming process that often results in the user abandoning the search before obtaining the desired information.

Embodiments of the disclosure address the above-mentioned problems and other deficiencies with current search engine technologies by providing a knowledge search system to allow end users (e.g., an individual using a search engine to obtain knowledge or information about a merchant, product, or service) to employ one or more knowledge search features (also referred to as "answers") to enable an improved searching experience. Knowledge can be defined as "facts" or data regarding a subject that can be stored in an indexed database that is searchable in response to an end user search query. In some embodiments, the knowledge search engine platform includes a natural language processor to process search query hints and auto completion techniques to intuitively guide the end user to accurate and informative search results. In an embodiment, the processing is conducted by the knowledge search engine platform based on information about certain data associated with the business product data. Using the knowledge search engine according to embodiments of the present disclosure, entity users (i.e., a user operating on behalf of a business entity or merchant) can centralize structured public data about their entity, and surface that data in response to end user search queries directly via the merchant system (e.g., a website associated with the merchant). Advantageously, a merchant system includes a knowledge search engine platform to process end-user search queries to provide search results from information stored by the merchant system along with a set of third party data publishers (e.g., data sources such as Google®, Facebook™, Bing™, Apple™, and other search service providers). The knowledge search engine platform provides an integrated search engine configured to generate search results based on multiple data sets from multiple search provider sources including a native data set (e.g., data maintained by the merchant system) and third-party data sets (e.g., data acquired from one or more third party search providers).

FIG. 1 illustrates an example computing environment 100 including a merchant system 102 (e.g., a merchant-controlled website or application) executing a knowledge search system 110, according to embodiments of the present disclosure. In one embodiment, the knowledge search system 110 may be integrated or embedded within the merchant system 102 and executable in response to a search query input received from an end user system. In an embodiment, the knowledge search system 110 may be accessible via the merchant system 102 and executed on one or more separate computing devices (e.g., servers). The knowledge search system 110 can include a memory 160 to store instructions associated with the operations, features and functionality described herein and one or more processing devices 150 to execute the instructions.

As used herein, the term "end user" refers to one or more users operating an electronic device (e.g., end user system 130) to submit a search query 140 associated with an entity (e.g., a merchant associated with the merchant system 102) for processing by the knowledge search system 110. In an embodiment, the end user may initiate a search by entering an input query via an interface of a merchant's webpage. For example, the end user, using the end user system 130, may be a customer or prospective customer searching for information about a merchant associated with the merchant system 102. The knowledge search system 110 may be communicatively connected to the end user system 130 via a suitable network. The knowledge search system 110 is configured to receive a search query and generate a set of search results in response to search query initiated by the end user system 130. For example, the end user system 130 may be any suitable computing device (e.g., a mobile device, a desktop computer, a laptop computer, etc.) associated with an end user in search of information relating to the merchant or a related product or service. In an embodiment, the end user system 130 submits a search query to the merchant system 102. In some embodiments, the knowledge search system 110 may be communicatively coupled to the merchant system 102 or integrated or embedded within the merchant system 102.

The knowledge search system 110 enables an end user operating a communicatively connected end user system 130 to initiate a search via the merchant system 102 by submitting a search query input via an interface of the merchant system (e.g., a graphical user interface) and receive search results that are integrated from multiple different search provider sources. In some embodiments, the knowledge search system 110 can include one or more software and/or hardware modules, including a query router 112, a verification component 114, a ranking component 116, a response integrator 118, the one or more processing device 150, and the memory 160. In one embodiment, the components or modules of the knowledge search system 110 may be executed on one or more computer platforms of the merchant system 102 that are interconnected by one or more networks, which may include the Internet. The components or modules of the knowledge search system 110 may be, for example, a hardware component, circuitry, dedicated logic, programmable logic, microcode, etc., that may be implemented in the processing device of the knowledge search system.

In some embodiments, the query router 112 receives a search query input associated with the merchant (e.g., a question about the merchant's goods or services) from the end user system 130. The query router 112 is operatively connected to multiple different providers of information, referred to as search provider sources 170 (e.g., the first search provider source, the second search provider source, the third search provider source, the fourth search provider source, the fifth search provider source, and the Nth search provider source). One or more of the search provider sources can include information that is managed, maintained, controlled, and provisioned by the merchant system (e.g., the first, second, third, and fourth search provider sources in FIG. 1). In an embodiment, one or more of the search provider sources can include information that is managed maintained, controlled, and provisioned by a third party system (e.g., the fifth and Nth search provider sources in FIG. 1).

In an example, if the merchant system 102 is a financial institution website (e.g., a bank website), the first search provider source can include a financial advisor data store (e.g., a source of information relating to financial advisors), the second search provider source can include a bank branch and ATM data store, the third search provider source can include a Frequently Asked Questions (FAQ) data store. In this example, the fifth and Nth search provider source can be third-party providers of information, such as, for example, the Zendesk™ platform, the Swiftype™ platform, etc.

According to embodiments, the one or more pages (e.g., webpages or elements of a web application) of the search provider source can be customized (e.g., corresponding APIs can be configured to render the pages of the search provider source as desired). In an embodiment, the knowledge search system 110 provides processes to build and host vertical search pages through a self-serve page system. In an embodiment, these webpages can inherit global branding associated with the merchant system 102 and use the configuration to render a search page for providing search results in response to a submission of a search query 140 by one or more end user systems 130.

In an embodiment, the knowledge search system 110 can provide a universal or "home" search page that collects search result data from multiple different vertical sources to generate an aggregated search results page or interface. In an embodiment, in addition to the universal search page, there are individual vertical source search pages. In an embodiment, the universal search page and the one or more vertical search pages can inherit global branding associated with the merchant.

In an embodiment, the knowledge search system 110 can embed one or more search provider source templates to render search responses. In an embodiment, when a search provider source is embedded in the universal search platform, the universal search platform can use a template system to render the search results. In an embodiment, one or more templates can be generated per search provider source that inherits the global branding associated with the merchant system 102. In an embodiment, a search provider source (e.g., a component of the merchant system 102) can be associated with multiple templates that a merchant user can select during configuration of the search provider source. In an embodiment, a default or standard templates can be configured as a customized template and applied to one or more search provider sources.

In an embodiment, the query router 112 routes or transmits the search query input to the set of one or more search provider sources 170 and receives a set of responses in return. In an embodiment, the set of responses can represent data and corresponding data sources that are verified by a verification component 114 of the query router 112. In an embodiment, the verification component 114 configured to execute a verification process relating to the search provider sources and the responses returned by the search provider sources. In an embodiment, the verification component 114 analyzes each search provider source and generates a determination whether the search provider source is verified or unverified (e.g., assigns a verified status or an unverified status to each of the response elements and search provider sources). In an embodiment, each response (e.g., search results returned in response to a search query 140) received from the search provider sources is identified as having either a verified status or an unverified status. In an embodiment, each of the search provider sources can be identified as a having either a verified status or an unverified status. For example, if the verification component 114 determines that a first response was received from a merchant system-managed provider source, then the verification component 114 can confirm or identify (e.g., mark, tag, or otherwise associate) the response as verified.

In one embodiment, the verification component 114 can communicate with a user of the merchant system (e.g., a merchant user) to request verification (e.g., confirmation of the accuracy and correctness) of information received from a search provider source 170. In an embodiment, the verification component 114 can communicate with the merchant user to confirm one or more search provider sources as a verified or trusted provider of merchant information. In an example, the verification component 114 can transmit one or more notifications to a merchant user with a listing of one or more search query responses, information identifying one or more search provider sources, or a combination thereof to the merchant user for verification or rejection.

In an embodiment, the knowledge search system 110 can be configured to enable the provisioning of search query responses from one or more search provider sources 170 that have either been pre-verified by the merchant or that are owned, controlled or managed by the merchant so that only verified information is returned to the end user system 130 in response to a search query 140.

In an embodiment, the ranking component 116 is configured to receive the set of search query responses from multiple different search provider sources. Advantageously, in an embodiment, the ranking component 116 can generate a first set of rankings associated with the search query responses and a second set of rankings associate with the search provider sources (e.g., verticals). Accordingly, each individual search query response is assigned a ranking or score. Furthermore, in an embodiment, each search provider source is also assigned a ranking or score. In an embodiment, for a given search query, the ranking component 116 can identify a highest ranking search provider source (e.g., the second search provider source of FIG. 1) and then identify the one or more highest ranking search responses provided by the identified highest ranking search provider source.

For example, the ranking component 116 can ranking ten search provider sources based on search provider source criteria (e.g., a trustworthiness level associated with the search provider source, whether the search provider source is associated with the merchant system, historical user engagement activity levels associated with the search provider source, etc.). If, based on the ranking of search provider source 7 (of the ten search provider sources) as the highest ranked search provider source, the ranking component 116 can identify the one or more highest ranked search responses provided by search provider source 7 for provisioning to the end user via the response integrator 118.

In an embodiment, the ranking component 116 first ranks or scores each search provider source. For example, if the search query is "New York City", a "locations" search provider source can provide a set of search responses including various locations in New York City. In this example, a "jobs" search provider source can provide a set of search responses including various employment opportunities in New York City. In this example, a "FAQ" search provider source can provide a set of search responses including frequently asked questions associated with New York City. Following the return of the different search responses by the different search provider sources, the response integrator 118 can combine the different search results together. In an embodiment, the response integrator 118 uses the quality (e.g., ranking or score) of the search results and the quality of the first search result to determine an optimal order of the search provider sources. In an embodiment, the response integrator 118 generates a display including the presentation of the search provider sources in an order that is based on the ranking information. In an embodiment, the ranking information can be used to re-order one or more tabs or links associated with the search interface (e.g., tabs associated with the multiple different search provider sources, such as the tabs shown in FIG. 5 including the "All" tab, the "Advisors" tab, the "Credit Cards" tab, the "Locations" tab and the "FAQ" tab).

In an embodiment, the ranking component 116 analyzes the search query to match an intent of the search query to a highest ranked or "best" search provider source the best vertical and then within that vertical try to find the most relevant search results.

In an embodiment, the rankings of the search query responses and search provider sources can be executed by the ranking component 116 in combination with verification status information (i.e., verification results) received from the verification component 114 or without verification status information.

In an embodiment, the ranking component 116 is configured to receive the set of search query responses and corresponding verification results (e.g., indications of verified or unverified) from the verification component 114. In an embodiment, a verified response can be assigned a higher weight (e.g., level of credibility), score, or grade as compared to an unverified response by the ranking component 116. In an embodiment, the search query input and the set of responses, the ranking component 116 generates a grade or score (e.g., a percentage value) corresponding to the suitability, accuracy, responsiveness, etc. of each response. An example of the scores or grades generated by the ranking component 116 corresponding to search query responses received from multiple different search provider sources (e.g., a first search provider, a second search provider . . . an Nth search provider) is shown in FIG. 3. In an embodiment, the ranking component 116 can consider the verification status (e.g., the result of the verification processing relating to a response or search provider source) in generating the grade or score for each response.

Figure 4:
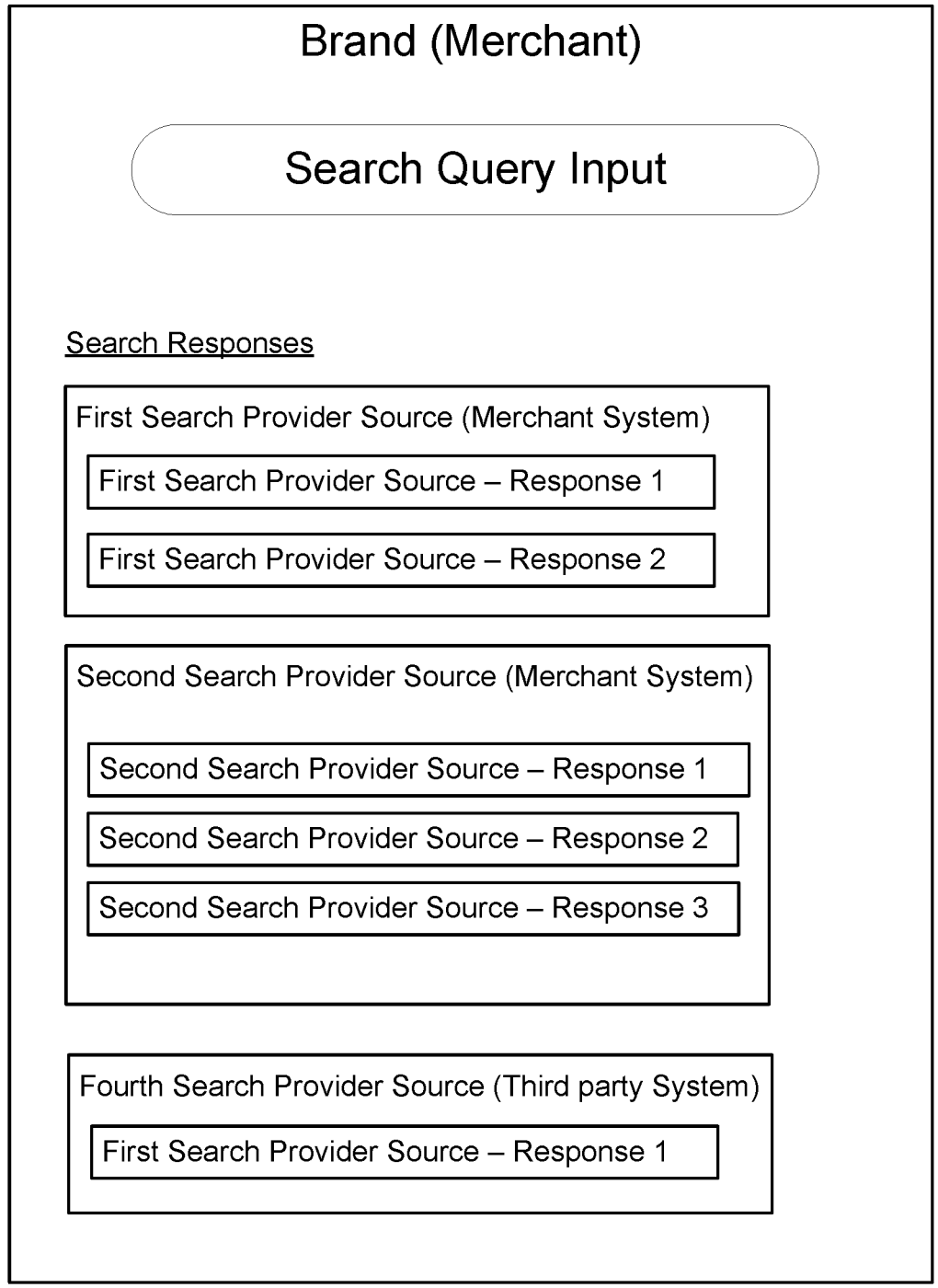
FIG. 4 illustrates an example display presented via an interface of a merchant system including search results aggregated from multiple search provider sources in response to a search query, in accordance with one or more aspects of the disclosure.
Figure 5:
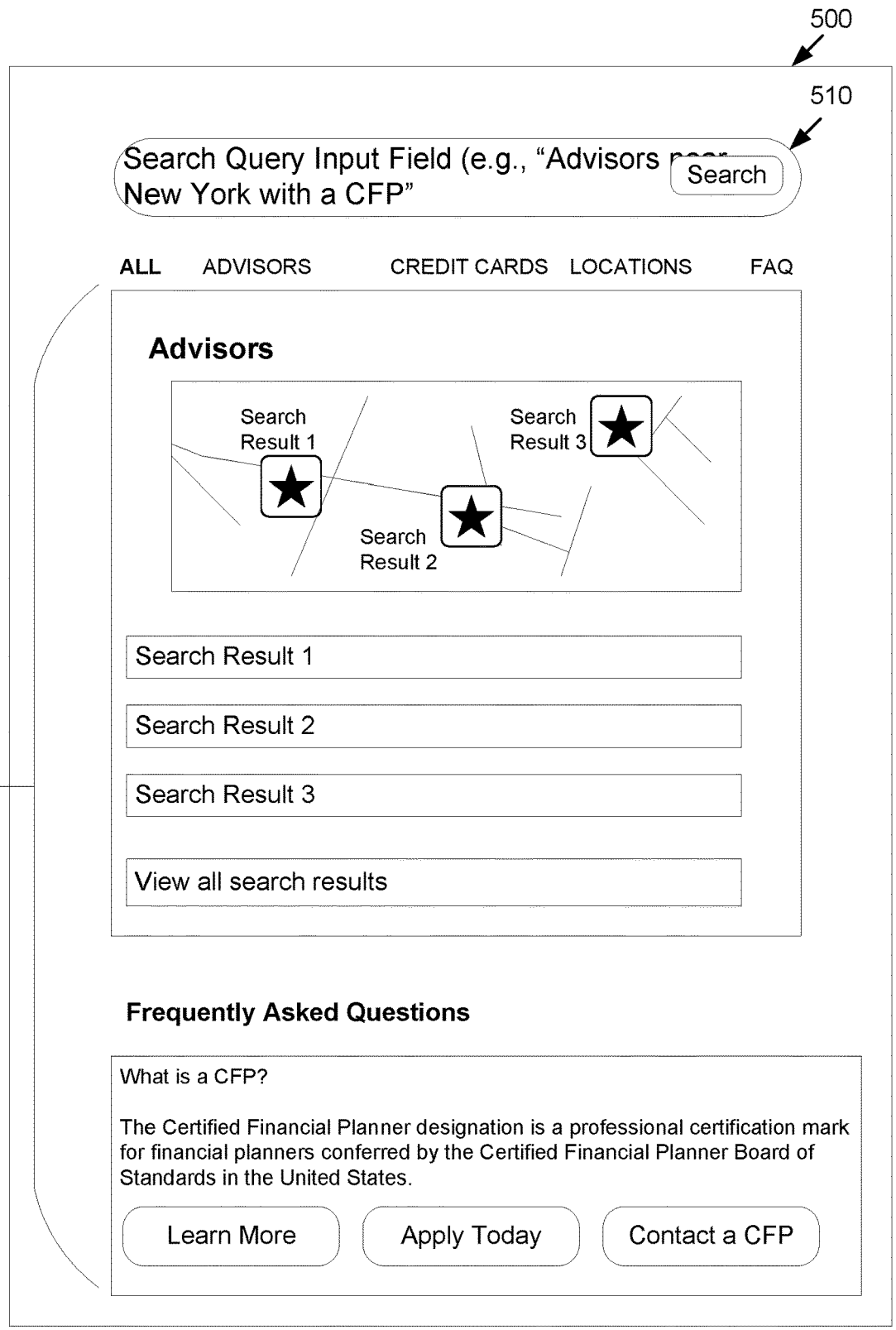
FIG. 5 illustrates an example display presented via an interface of a merchant system including search results aggregated from multiple search provider sources in response to a search query, in accordance with one or more aspects of the disclosure.

In an embodiment, the response integrator 118 of the query router 112 is configured to receive the search responses and ranking information and integrate the multiple responses for return to the end user system via the merchant system 102 (e.g., via a display of a webpage of the merchant system 102). Examples of the integrated responses are shown in FIGS. 4 and 5. As shown in FIGS. 4 and 5, the integrated (e.g., single) interface includes multiple different search responses from multiple different search provider sources. In an embodiment, as shown in FIGS. 4 and 5, the responses are organized and displayed in accordance with their respective ranking, grade or score (as determined by the ranking component 116). For example, as shown in FIG. 4, the ranking component 116 can assign a first highest rank, grade or score to "Response 1" generated by the First Search Provider Source, a second highest rank to "Response 2" generated by the First Search Provider Source, a third highest rank to "Response 1" generated by the Second Search Provider Source, and so on. In FIG. 4, the search responses or results are organized in a single integrated display with responses that were subjected to the verification processing by the verification component 114.

In the example shown in FIG. 5, an end user system can access an interface 500 (e.g., a webpage interface) associated with the merchant system (e.g., a merchant's webpage) and initiate a search query via a search field 510. Advantageously, via the single interface 500 of the merchant system (e.g., generated by and accessed via a website associated with the merchant system), search results 520 including multiple search responses can be integrated and displayed to the end user. In an embodiment, the different responses integrated into the interface 500 of the merchant website can be retrieved from multiple different search provider sources, such as, for example, an "Advisors" source including information about the merchant's advisors which is managed by the merchant system and a "Frequently Asked Questions" source including information about frequently asked questions which is managed by the merchant system. Although not shown in FIG. 5, the integrated search responses can include one or more search responses from third party vertical search sources.

In an embodiment, the multiple search responses can be organized by search provider source and presented in order accordingly to their respective verification and ranking information. In the example shown in FIG. 5, it can be determined by the ranking component 116 that the location map and associated information obtained via the "Advisors" search provider source has a higher ranking (e.g., a higher score or grade) than the "What is a CFP?" information obtained via the "Frequently Asked Questions" search provider source. In view of this determination, the "Advisors" portion of the search results is presented at a higher position in the graphical user interface than the "Frequently Asked Questions" portion of the search results. In an embodiment, the ranking can reflect a level of suitability or responsiveness to the search query (e.g., "Advisors near New York with a CFP") and the verification information (e.g., is the corresponding information and/or search provider source verified or unverified).

In an embodiment, the response integrator 118 is configured to apply a set of rules relating to the generation of the search results for provisioning to the end user system 130. In an embodiment, the set of rules are configurable or customizable by the merchant system 102. For example, a merchant system 102 can apply one or more specific rules or logic to adjust the search results within their merchant system. In an embodiment, a default set of rules can indicate that the search results are provisioned based on relevance and verification, as described above, one or more merchant-specific rules can be established for a merchant system 102.

In an embodiment, the response integrator 118 of the knowledge search system 110 can enable a merchant system 102 to establish query rules to augment or adjust the default search result integration process. For example, the response integrator 118 can provide an "if this, then that" query rule framework that enables a merchant system 102 to adjust, fine-tune, or override results behavior depending on the one or more search query terms and an intent detected.

In an embodiment, the one or more query rules can be used to adjust the order of presentation or listing of the search results within (or provided by) a search provider source (e.g., boost search results (e.g., increase or improve the position of a search result) and bury search results (e.g., decrease or lower the position of a search result). In an embodiment, the one or more query rules can be used to adjust the order of display or listing of the source provider sources (e.g., boost and bury source provider systems in a display of the search results).

An example merchant-specific query rule can include, but is not limited to the following: to prevent cancellations, a telecommunication company can establish a query rule indicating that if the user searches for "cancel my account," the response integrator 118 first returns a set of results that highlights how a customer can downgrade or pause a subscription, before displaying FAQ relating to how to cancel an account.

Another example merchant-specific query rule can include, but is not limited to the following: a financial services firm can establish a query rule configured to boost loan officers in their search results, if it is determined that the end user is in a high value segment.

Yet another example merchant-specific query rule can include, but is not limited to the following: a retailer generates a merchant-specific query rule that indicates, if a new user is searching on the site, the results returned display "Products" at the top of the webpage. Other example merchant-specific query rules can include, but are not limited to the following: a bank restricts the results depending on the role of the logged-in user; to reduce strain on their call center, an insurance firm boosts the results for "Live Chat" if a customer searches for "call customer support, etc.

In an embodiment, to establish a merchant-specific query rule, the response integrator 118 identifies a set of criteria or conditions and one or more corresponding actions. In an embodiment, if the search query input meets the conditions associated with the query rule, then the response integrator 118 performs the corresponding one or more actions. In embodiments, the criteria or conditions can relate to one or more of a search term, a context, a referrer webpage URL, a search type, a vertical associated with the search query.

In embodiments, the one or more actions can include one or more of a search result boost action (e.g., boosting a search result element to a higher position on the search results page), a search result bury action (e.g., burying or lowering a position of a search result element on the search results page), a returning of no results action (e.g., returning no search results to a given search query), an add filter action (e.g., adding a filter to the search results), a boost intent action (e.g., adjusting an intent of a query to boost or bury one or more search provider sources in the search results page), and a return pinned result (e.g., returning a predefined or preset set of search results as an override or replacement to the search results provided by the ranking component 116).

In an embodiment, as noted above, the criteria and action for a merchant-specific query rule can include a context associated with a search query. The context can be a custom-defined object (e.g., a JSON object) that can include one or more parameters such as attributes associated with the end user, a role associated with the end user, a segment associated with the end user, or other suitable parameter. In an example of a context-based query rule, if an end user executing a search query via a financial services merchant system is identified as a "high net worth" individual (e.g., the context is identified relating to a net worth attribute of the end user), the response integrator 118 can perform a corresponding action pursuant to the query rule (e.g., prioritize information relating to Advisor A in the search results).

In an embodiment, the context can be applied by the knowledge search system 110 at a rule-level to determine if a rule is to be applied. In this embodiment, the knowledge search system 110 can determine if a certain context criteria is satisfied, and if so, apply or not apply one or more certain query rules.

In an embodiment, the knowledge search system 110 can be configured to receive historical data relating to end user activity (e.g., clicks or interactions with previously provisioned search results) associated with an end user engagement level and adapt a subsequent set of search results based on the interaction information. In an embodiment, the end user engagement activity data can be identified, tracked and maintained for use as feedback for the ranking component 116 and or the response integrator 118 in setting or adjusting a subsequent search result. In an embodiment, the search results are adjusted or changed for all end user systems based on end user engagement activity. In other embodiments, the search results are curated for each end user system for activity associated with that end user system. In such embodiments, the search results may be different for different end user systems, based on the manner in which respective end user systems interacted with previously provisioned search results.

For example, the knowledge search system 110 may return a first set of search results having a first ranked order to one or more end users. The one or more end users may respond by clicking on a search result element that is one of the lower ranked search results more than others. The engagement activity can be identified and stored by the knowledge search system 110 for use in re-ranking or adjusting a subsequent search result (e.g., re-positioning the search result element from a lower ranked position to a higher ranked position.

In this embodiment, an initial position of a search result element within a ranked set of search result elements can be modified or updated based on the measured end user engagement activity (e.g., a number of clicks or interactions within a period of time) associated with the search result element. In an embodiment, a ranking of a first search result element generated by the ranking component 116, per the process described above, can be adjusted in view of the engagement level activity (e.g., an element having an initial ranking position of 4 can be adjusted to a ranking position of 2 based on a high level of end user engagement).

In one embodiment, the merchant system may include one or more components of the knowledge search system. In this embodiment, the merchant system 102 and the knowledge search system 110 may be integrated such that the merchant system 102 employs the knowledge search system 110 and its related functionality to respond to one or more input or search queries received from a communicatively connected end user system 130. According to embodiments of the present disclosure, as shown in Figure, the user device may submit a search query input via an interface to the merchant system 102 (e.g., a webpage of the merchant system 102).

The merchant, via the merchant system 102, may use the knowledge search system 110 to manage its data, including providing verification information for use by the verification component 114 to verify the data provided in response to the search query inputs or verify a search provider. In an embodiment, the merchant can also provide an indication that the search result information or a search provider source is unverified, incorrect, incomplete, or inaccurate. Accordingly, the quality of the information provided by the response integrator 118 can be improved and increased by the verification process executed by the verification component 114.

In an embodiment, by application of the verification process, the merchant controls all the data that is being returned to the end user system 130 from the knowledge search system 110 via the merchant website in response to a search query. In one embodiment, the merchant user employs the verification component 114 to make or request changes to the search result data (e.g., data that may be provided to an end user in response to an associated search query input).

In some embodiments, the knowledge search system is communicatively connected to the multiple search provider sources 170 (e.g., search provider sources managed by the merchant system and search provider sources managed by a third party system) In an embodiment, each of the search provider sources 170 can include one or more modules (e.g., APIs) with which the knowledge search system 110 interacts for carrying out operations and providing relevant data to the user device(s) via the response integrator. For example, each of the search provider sources 170 may include APIs to access one or more prescribed databases dedicated to storing information (e.g., product brand data) regarding the products, services, employees, events, etc. of a particular business. In other embodiments, a database hosted by the merchant system 102 may include all or a portions of the merchant data associated with the merchant-based search provider sources. In another embodiment, a merchant uses the knowledge search system 110 to manage information associated with the multiple search provider sources 170. For example, one or more databases can be configured to store data corresponding to the respective search providers.

According to embodiments of the present disclosure, the query router 112 executes searches based on the search query 140 provided by an end user system 130 (e.g., input queries submitted by an end user via an interface of the merchant system 102). In one embodiment, the search may be conducted based on information inputted by the end user (e.g., their zip code, geolocation or other information that could lead to the determination of the end user's location and/or location of interest). In another embodiment the search may be based on where the end user (e.g., a location of the user device) is searching from (for example, the user device's IP address is queried and used in connection with the search). In an embodiment, the verification component 114 may assess the search results or searchable data to provide to the merchant user for verification purposes as part of the verification processing. In one embodiment, the search response, searchable data, and/or information associated with a search provider may be presented to the merchant user as a request for verification. In another embodiment, the verification component 114 provides one or more recommendations to the merchant system 102 to improve the content of the search results relating to the merchant, as described in detail herein.

Figure 2:
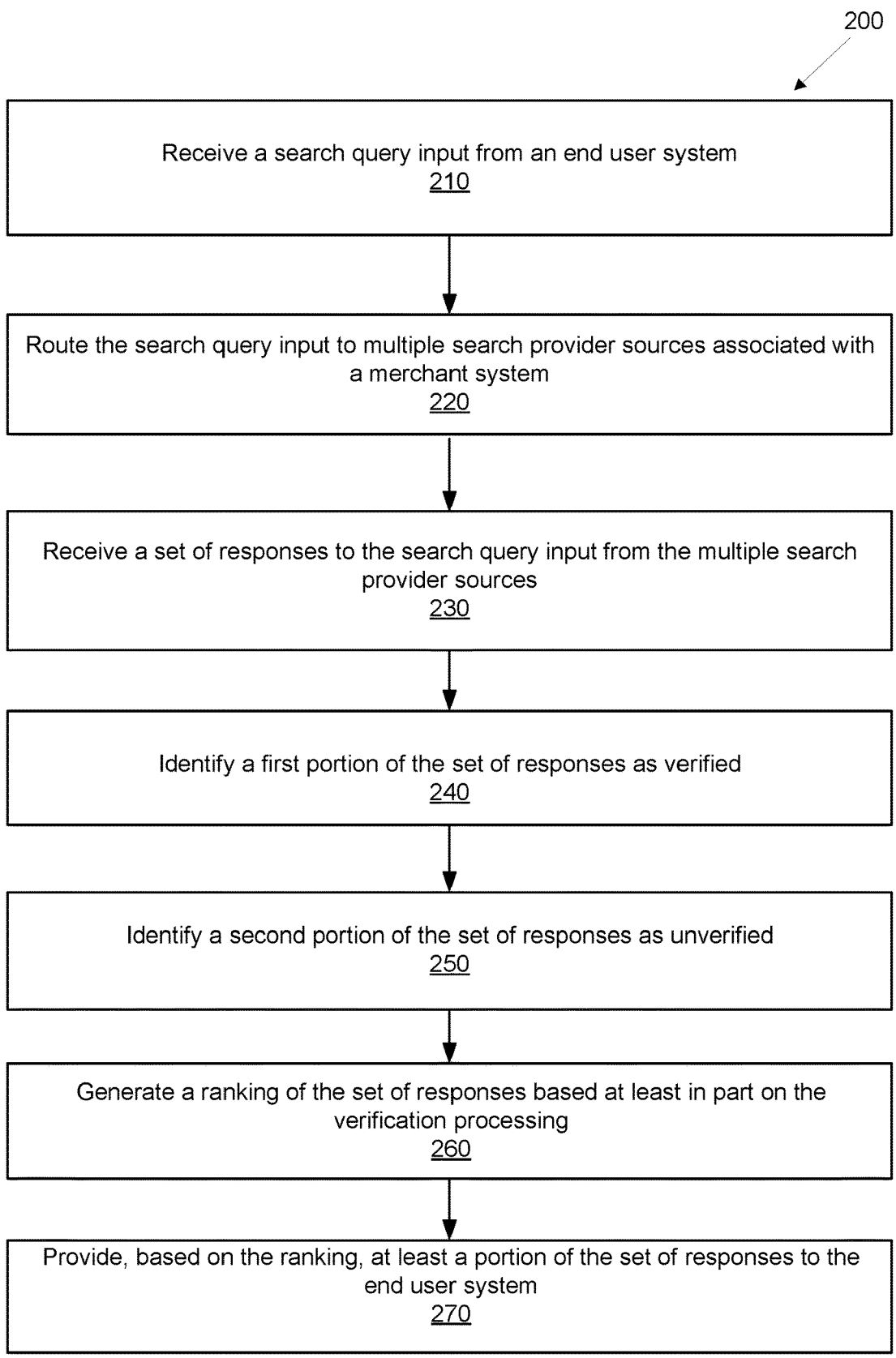
FIG. 2 illustrates an example method to provide, via an interface of a merchant system, ranked search results in response to a search query from an end user system, in accordance with one or more aspects of the disclosure.

FIG. 2 illustrates a flow diagram relating to an example method 200 including operations performed by a knowledge search system (e.g., knowledge search system 102 of FIG. 1), according to embodiments of the present disclosure. It is understood that the flowchart of FIG. 2 provides an example of the many different types of functional arrangements that may be employed to implement the operation of the notification management component as described herein. Method 200 may be performed by a processing logic that may comprise hardware (e.g., circuitry, dedicated logic, programmable logic, microcode, etc.), software (e.g., instructions run on a processing device), or a combination thereof. In one embodiment, the knowledge search system executes the method 200 to identify search results in response to a search query relating to a merchant that is submitted via a merchant system and integrate the search results via a single user interface of a website or application associated with the merchant system.

In block 210, processing logic receives a search query input from an end user system. In an embodiment, the search query input is received via an interface of a webpage or application of a merchant system (e.g., the merchant's own website or application). In an embodiment, the search query input relates to information associated with the merchant.

In block 220, the processing logic routes the search query input to multiple search providers associated with the merchant system. In an embodiment, each search provider can store and maintain data associated with a different category, type, or classification of data relating to the merchant. The search providers can be first party-controlled (e.g., controlled by the merchant system) or third party controlled (e.g., controlled by a third party such as Zendesk or Swiftype).

In block 230, the processing logic receives a set of response to the search query input from the multiple search providers. In an embodiment, the set of responses can include multiple different responses received from the multiple search providers.

In block 240, the processing logic identifies a first portion of the set of responses as verified. In an embodiment, the verification component can determine that a response has been verified by the merchant system (e.g., confirmed as representing accurate and complete information). In an embodiment, a search response can be identified as verified if the response was provided by a search provider that is verified. In an embodiment, the first portion of the set of responses can be marked, designated or labeled as verified.

In block 250, the processing logic can identify a second portion of the set of responses as unverified. In an embodiment, if no verification information is identified in connection with a response, the verification component can determine the response is unverified and execute a verification process including communicating with a user of the merchant system to coordinate verification of the search response. In an embodiment, the second portion of the set of responses can be marked, designated or labeled as unverified. It is noted that during operation 240, it can be determined that all of the information associated with the set of responses is verified. As such, in this embodiment, block 250 may not be performed, since no information verification is needed.

In block 260, the processing logic can generate a ranking of the set of responses based at least in part on the verification determination (e.g., identifying of verified and unverified search responses). In other embodiments, the ranking may be generated based on a level of suitability, without executing verification processing.

In an embodiment, the ranking can include a score or grade associated with each response to determine a relative level of suitability or responsiveness to the search query. For example, each response can be ranked and assigned a score (e.g. a percentage) reflecting the relative strength of the search responses, as shown in the example in FIG. 3.

In block 270, the processing logic provides, based on the ranking, at least a portion of the set of response to the end user system. In an embodiment, multiple search responses from different search providers are integrated into a single interface for provisioning to the end user system.

Figure 6:
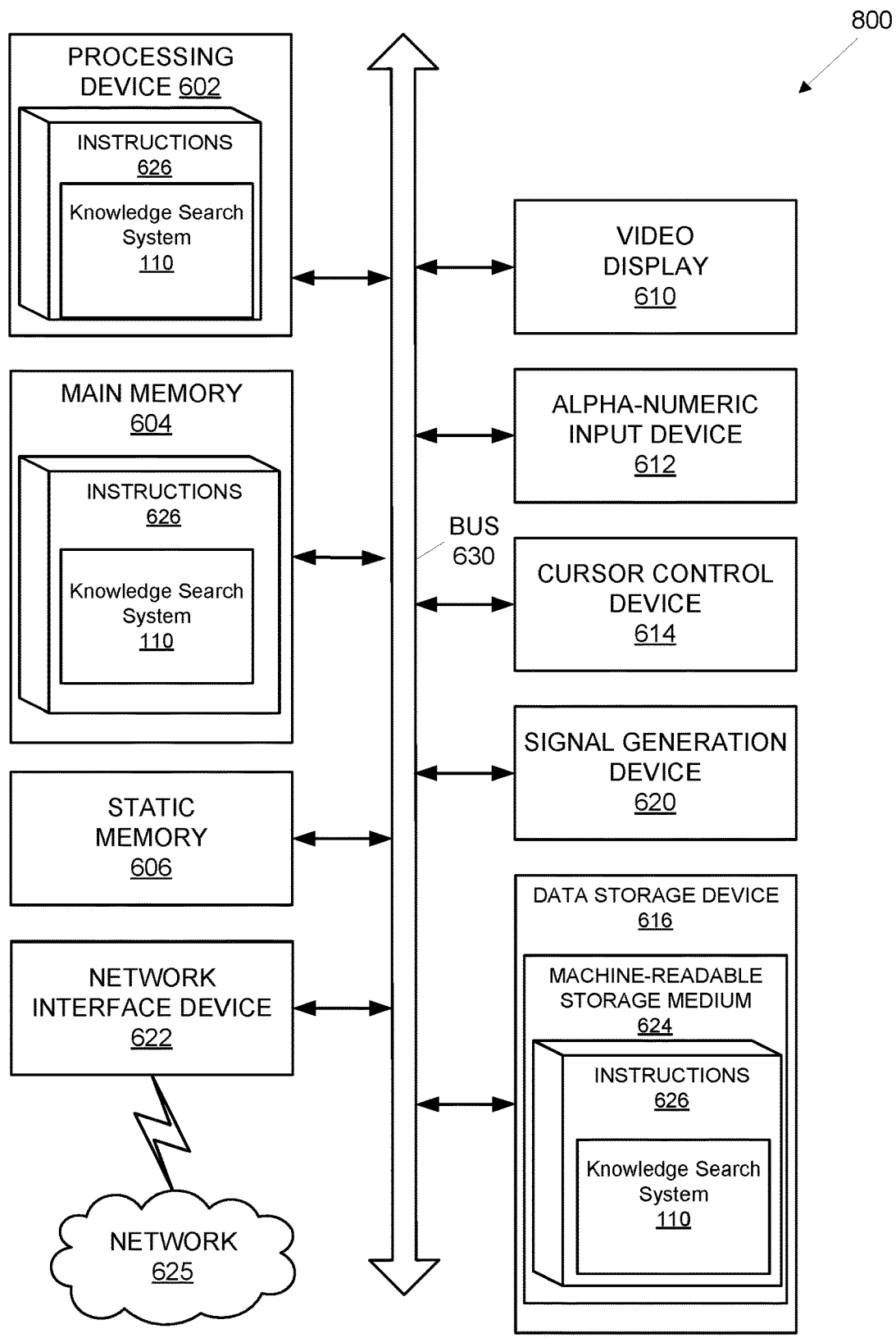
FIG. 6 illustrates an example computer system operating in accordance with some implementations.

FIG. 6 illustrates an example computer system 600 operating in accordance with some embodiments of the disclosure. In FIG. 6, a diagrammatic representation of a machine is shown in the exemplary form of the computer system 600 within which a set of instructions, for causing the machine to perform any one or more of the methodologies discussed herein, may be executed. In alternative embodiments, the machine 600 may be connected (e.g., networked) to other machines in a local area network (LAN), an intranet, an extranet, or the Internet. The machine 600 may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine 600. Further, while only a single machine is illustrated, the term "machine" shall also be taken to include any collection of machines that individually or jointly execute a set (or multiple sets) of instructions to perform any one or more of the methodologies discussed herein.

The example computer system 600 may comprise a processing device 602 (also referred to as a processor or CPU), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 616), which may communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute a knowledge search system for performing the operations and steps discussed herein. For example, the processing device 602 may be configured to execute instructions implementing the processes and methods described herein, for supporting a knowledge search system, in accordance with one or more aspects of the disclosure.

Example computer system 600 may further comprise a network interface device 622 that may be communicatively coupled to a network 625. Example computer system 600 may further comprise a video display 610 (e.g., a liquid crystal display (LCD), a touch screen, or a cathode ray tube (CRT)), an alphanumeric input device 612 (e.g., a keyboard), a cursor control device 614 (e.g., a mouse), and an acoustic signal generation device 620 (e.g., a speaker).

Data storage device 616 may include a computer-readable storage medium (or more specifically a non-transitory computer-readable storage medium) 624 on which is stored one or more sets of executable instructions 626. In accordance with one or more aspects of the disclosure, executable instructions 626 may comprise executable instructions encoding various functions of the knowledge search engine 160 in accordance with one or more aspects of the disclosure.

Executable instructions 626 may also reside, completely or at least partially, within main memory 604 and/or within processing device 602 during execution thereof by example computer system 600, main memory 604 and processing device 602 also constituting computer-readable storage media. Executable instructions 626 may further be transmitted or received over a network via network interface device 622.

While computer-readable storage medium 624 is shown as a single medium, the term "computer-readable storage medium" should be taken to include a single medium or multiple media. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "routing," "identifying," "generating," "providing," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the disclosure also relate to an apparatus for performing the methods described herein. This apparatus may be specially constructed for the required purposes, or it may be a general-purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the scope of the disclosure is not limited to any particular programming language. It will be appreciated that a variety of programming languages may be used to implement the teachings of the disclosure.

It is to be understood that the above description is intended to be illustrative, and not restrictive. Many other embodiment examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:

receiving, by a processing device of a merchant system, a search query input comprising a keyword from an end user system;

routing the search query input to a plurality of search provider sources, wherein each of the plurality of search provider sources is operatively connected to a data store of the merchant system that stores data associated with the merchant system;

executing a verification process of the plurality of search provider sources, such that search provider sources managed by the merchant system are identified as verified;

receiving a set of responses to the search query input from a set of search provider sources comprising at least a portion of the plurality of search providers sources;

identifying a first portion of the set of responses as having a verified status when the response was provided by a search provider that is verified, wherein the ranking is based at least in part on the verified status associated with the first portion of the set of responses;

generating a first ranking of the first portion of the set of responses based on a trustworthiness level of each search provider source in the plurality of search providers sources;

generating a second ranking of the first portion of the set of responses based on a level of responsiveness to the search query input;

causing, based at least in part on the first ranking and the second ranking, a display comprising a search result integrating the set of responses;

receiving, from the merchant system, a merchant-specific query rule comprising a condition associated with the keyword and an action; and applying the merchant-specific query rule to adjust an order of the set of responses for display in response to a subsequent search query.

2. The method of claim 1,
wherein at least one of the first ranking or the second ranking is based at least in part on the verified status associated with the first portion of the set of responses.

3. The method of claim 1, wherein the display comprises the at least the portion of the set of responses aggregated from multiple different search provider sources.

4. The method of claim 1, wherein a position in the display of a first response of the at least the portion of the set of responses is determined based at least in part on the second ranking associated with the first response.

5. The method of claim 4, further comprising:
collecting end user engagement activity associated with the first response;
receiving a second search query input; and
adjusting the position of the first response in a second display of a second search result in response to the second search query input.

6. The method of claim 1, wherein the condition of the merchant-specific query rule is further associated with a context corresponding to the end user system.

7. A system comprising:
a memory to store instructions; and
a processing device, operatively coupled to the memory, to execute the instructions to perform operations comprising:
receiving, by an interface of a merchant system, a search query input from an end user system;
routing the search query input to a plurality of search provider sources, wherein each of the plurality of search provider sources is operatively connected to a data store of the merchant system that stores data associated with the merchant system;
executing a verification process of the plurality of search provider sources, such that search provider sources managed by the merchant system are identified as verified;
receiving a set of responses to the search query input from a set of search provider sources comprising at least a portion of the plurality of search providers sources;
identifying a first portion of the set of responses as having a verified status when the response was provided by a search provider that is verified, wherein the ranking is based at least in part on the verified status associated with the first portion of the set of responses;
generating a first ranking of the first portion of the set of responses based on a trustworthiness level of each search provider source in the plurality of search providers sources;
generating a second ranking of the first portion of the set of responses based on a level of responsiveness to the search query input;
causing, based at least in part on the first ranking and the second ranking, a display comprising a search result integrating the set of responses;
receiving, from the merchant system, a merchant-specific query rule comprising a condition associated with the keyword and an action; and
applying the merchant-specific query rule to adjust an order of the set of responses for display in response to a subsequent search query.

8. The system of claim 7,
wherein at least one of the first ranking or the second ranking is based at least in part on the verified status associated with the first portion of the set of responses.

9. The system of claim 7, wherein the display comprises the at least the portion of the set of responses aggregated from multiple different search provider sources.

10. The system of claim 7, wherein a position in the display of a first response of the at least the portion of the set of responses is determined based at least in part on the second ranking associated with the first response.

11. The system of claim 10, the operations further comprising:
collecting end user engagement activity associated with the first response;
receiving a second search query input; and
adjusting the position of the first response in a second display of a second search result in response to the second search query input.

12. A non-transitory computer readable storage medium comprising instructions that, when executed by a processing device of a source system, cause the processing device to perform operations comprising:
receiving, via an interface of a merchant system, a search query input from an end user system;
routing the search query input to a plurality of search provider sources, wherein each of the plurality of search provider sources is operatively connected to a data store of the merchant system that stores data associated with the merchant system;
executing a verification process of the plurality of search provider sources, such that search provider sources managed by the merchant system are identified as verified;
receiving a set of responses to the search query input from a set of search provider sources comprising at least a portion of the plurality of search providers sources;
identifying a first portion of the set of responses as having a verified status when the response was provided by a search provider that is verified, wherein the ranking is based at least in part on the verified status associated with the first portion of the set of responses;
generating a first ranking of the first portion of the set of responses based on a trustworthiness level of each search provider source in the plurality of search providers sources;
generating a second ranking of the first portion of the set of responses based on a level of responsiveness to the search query input;
causing, based at least in part on the first ranking and the second ranking, a display comprising a search result integrating the set of responses;
receiving, from the merchant system, a merchant-specific query rule comprising a condition associated with the keyword and an action; and
applying the merchant-specific query rule to adjust an order of the set of responses for display in response to a subsequent search query.

13. The non-transitory computer readable storage medium of claim 12,
wherein at least one of the first ranking or the second ranking is based at least in part on the verified status associated with the first portion of the set of responses.

14. The non-transitory computer readable storage medium of claim 13, wherein the display comprises the at least the portion of the set of responses aggregated from multiple different search provider sources.

15. The non-transitory computer readable storage medium of claim 13, wherein a position in the display of a first response of the at least the portion of the set of responses is determined based at least in part on the second ranking associated with the first response.

16. The non-transitory computer readable storage medium of claim 15, the operations further comprising:
  collecting end user engagement activity associated with the first response;
  receiving a second search query input; and
  adjusting the position of the first response in a second display of a second search result in response to the second search query input.

17. The non-transitory computer readable storage medium of claim 12, wherein the condition of the merchant-specific query rule is further associated with a context corresponding to the end user system.

* * * * *